April 9, 1929.  F. R. WEYMOUTH  1,708,373

CONTROL SURFACE OPERATING MECHANISM

Filed Dec. 7, 1927

Inventor
FREDERICK R. WEYMOUTH
By Attorney B. H. Carpenter

Patented Apr. 9, 1929.

1,708,373

UNITED STATES PATENT OFFICE.

FREDERICK R. WEYMOUTH, OF BUFFALO, NEW YORK, ASSIGNOR TO FAIRCHILD AIRPLANE MANUFACTURING CORPORATION, OF NEW YORK, N. Y.

CONTROL-SURFACE-OPERATING MECHANISM.

Application filed December 7, 1927. Serial No. 238,320.

This invention relates to control surface operating mechanisms for aircraft in general and specifically to aileron operating mechanism for folding wing airplanes.

One of the objects of this invention is to provide a separable connection in the aileron operating mechanism which will permit the wings to be folded without disturbing the aileron adjustment.

Another object of this invention is to provide a separable connection in the control surface operating mechanism which will be automatically separated by folding the part of the aircraft carrying the control surface and will be automatically returned to operative condition when the said part of the aircraft is returned to normal.

Another object of this invention is to provide a separable connection in control surface operating mechanism which is simple and rigid in construction, cheap of manufacture and efficient in operation.

Other objects and advantages of this invention will become apparent from the following specification, claims and appended claims, in which:—

Figure 1:
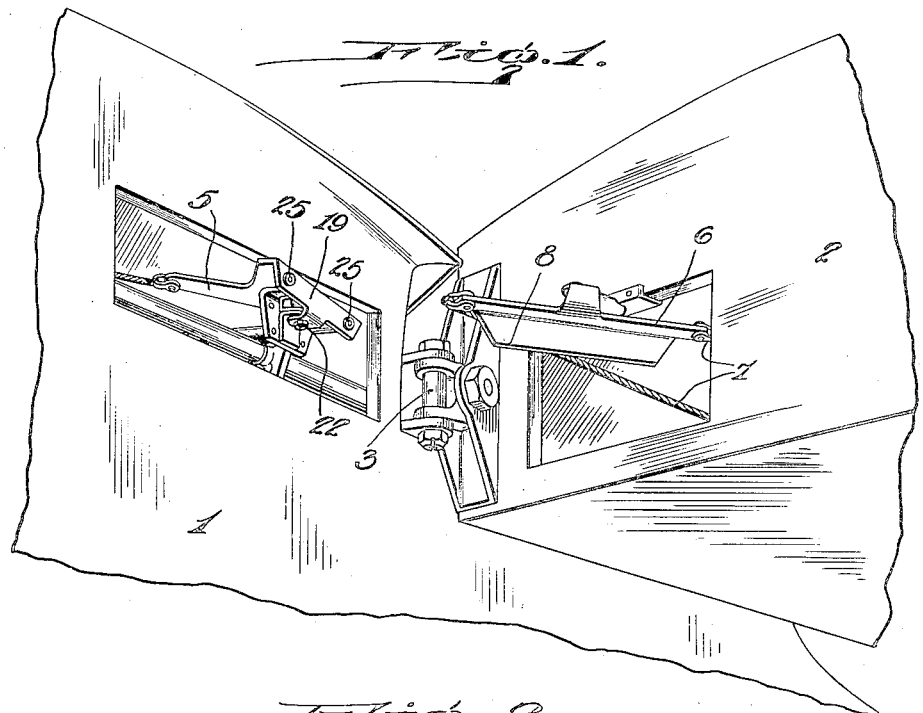
Fig. 1 is a fragmentary perspective view with the wing in folded position showing the separable control surface operating connection in separated condition.
Figure 2:
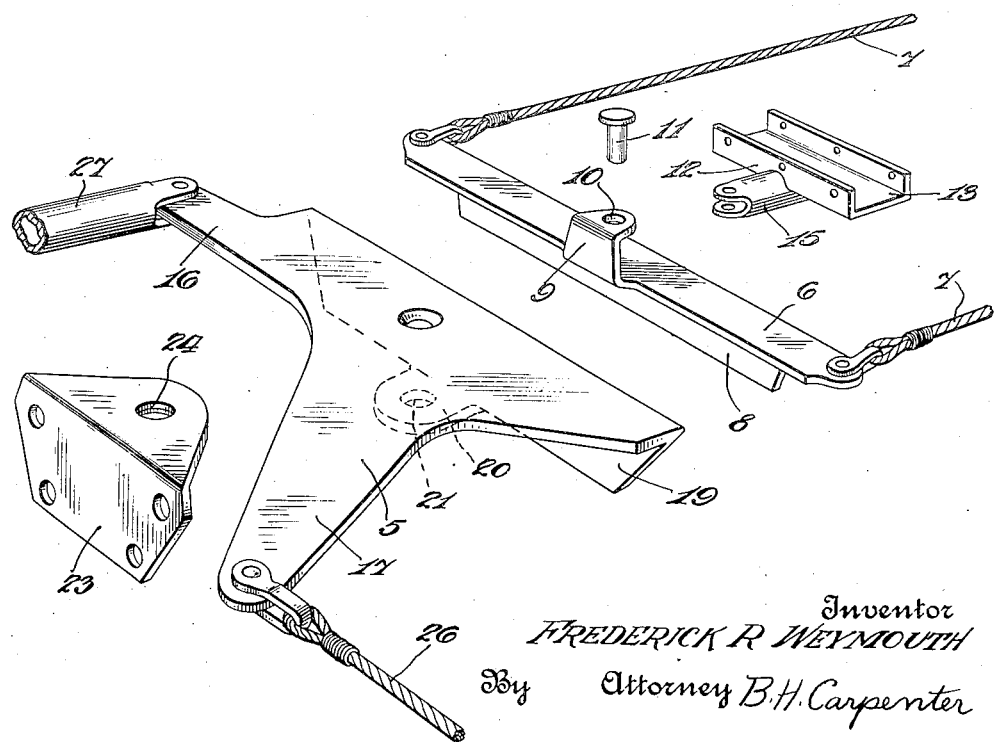
Fig. 2 is a distended view of the separable connection.

Referring to the drawings the body of the airplane is designated by the numeral 1 and the wing by the numeral 2. The wing 2 is attached to the body 1 by a pivotal hinge 3. The specific construction of this hinge forms no part of this invention and will therefore not be described in detail.

In the embodiment illustrated the aileron or control surface operating mechanism passes from within the body 1 through the interior of the wing 2 to the control surface. It is obvious that the operating mechanism could be positioned externally of the wing if desired.

A split lever is provided in the control surface operating mechanism between the folding wing and the body. This split lever comprises a lever 5 pivotally mounted from the body 1 and a lever 6 pivotally mounted on the folding wing. The specific construction of these levers will be fully described hereinafter. At this point it is sufficient to state that when the wing is in flying position the pivots of the levers 5 and 6 are in axial alignment and the levers are in operative contact with each other.

The lever 6 is centrally pivoted and a cable 7 extends from each end thereof to the control surface (not shown) carried by the wing 2. The lever 6 is preferably formed of pressed metal with a downwardly extending flange 8 and an upwardly projecting lug 9 turned over at the top and provided with an aperture 10 to receive pivot pin 11. The lower end of the pin 11 is received in an aperture in the top of the lever similar to the aperture 10 and in alinement therewith. A bracket member 12 is provided for pivotally supporting the lever 6 from the wing 2. This bracket comprises a channel 13, adapted to be secured to the end plate of the wing, and an outwardly extending tubular arm 15 brazed or welded thereto and provided with apertures adjacent the outer end thereof for receiving the pivot pin 11. When in assembled position the bracket 12 is secured to the wing and the lever 6 is pivotally connected to the arm 15 by the pin 11. It will be noted that the flange 8 extends downwardly below and to the rear, that is on the wing side, of the pivot point of the lever.

The lever 5 is also preferably formed of pressed metal with a rearwardly projecting horn 16, an inwardly projecting arm 17 and a downwardly projecting front or outer face 19 formed with a bent over lug 20. The lug 20 is provided with an aperture 21 adapted to receive a pivot pin 22. A similar aperture is formed in the upper plate of the lever and in alignment with the aperture 21 to receive the upper end of the pivot pin. The lever 5 is pivotally supported from the framework of the airplane body by a bracket 23 secured to the framework in any suitable manner as by welding or brazing. This bracket is of a built up structure and is provided with a pair of outwardly extending spaced members having alined apertures therein to receive pivot pin 22. The face 19 is directed outward.

The pivot of the lever 5 is slightly lower than that of the pivot 6 in order that when the wing is in flying position the lever 6 may extend over the lever 5 and the pivots of the levers come into axial alinement. When in this position, the face 19 of the lever 5 lies along the flange 8 of the lever 6 and transmits any pivotal movement of the lever 5 to the lever 6. In practice it has been found desirable to provide a slight cushioning action between the face 19 and the flange 8 and to this end rubber cushions designated by the numeral 25 are illustrated in the drawings.

The lever 5 may be actuated in any suitable manner from the usual manual control lever or wheel. In the drawings, I have shown a control cable 26 attached to the arm 17 of the lever 5 and a cross rod 27 pivoted to the horn 16 of the said lever. The specific construction of the airplane and the type of manual control used will vary the type of connections between the lever 5 and the manual control and I do not therefore desire to limit myself in any way in this respect. It is also obvious that my invention may be used in connection with a folding empennage or a folding fuselage in which cases the lever 5 might well be operated by a pair of cables.

From the foregoing description it will be apparent that the folding of the wings will in no way disturb the adjustment of the control surface operating mechanism. It is also obvious that the split lever permits the folding of the wings without any attention whatever to the control surface operating mechanism. All that is necessary to fold the wing is to disconnect the front spar connection (not shown) and swing the wing on the hinge 3. In bringing the wing again to flying position the control surface operating mechanism requires no attention. The parts of the split lever owing to their pivotal mounting automatically assume their proper relation with each other.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. In a folding wing airplane, control surfaces carried by said wings, operating mechanism for said control surfaces including a split lever in said operating mechanism having a member pivotally mounted on the airplane body and a member pivotally mounted on a folding wing and cooperating with said first mentioned member when the wing is in flying position.

2. The combination with an airplane having a body, a folding wing, a control surface carried by said wing, of operating mechanism for said control surface including a lever pivotally mounted on said body and cooperating directly with a lever mounted on said wing when said wing is in flying position.

3. In an aileron operating mechanism for a folding wing airplane having a body, a folding wing, and a control surface carried by said wing, a lever pivotally mounted on said wing and operatively connected to said control surface, a lever pivotally mounted on said body and held in operative relation with the first mentioned lever by said wing when in flying position.

4. In an aileron operating mechanism for a folding wing airplane having a body, a folding wing, and a control surface carried by said wing, a lever pivotally mounted on said wing and operatively connected to said control surface, a lever pivotally mounted on said body and held in operative relation with the first mentioned lever by said wing when in flying position and separated therefrom by folding said wing.

5. In a folding wing airplane, a body, a folding wing, a control surface carried by said wing, control surface operating means carried by said folding wing in adjustment in all positions of the wing and including a pivotally mounted lever, actuating means for said operating means carried by said body and including a lever cooperating directly with the lever on said wing when the wing is in flying position.

6. The combination in an airplane, having a body and a portion foldable relative to said body, of a control surface carried by said foldable portion, operating mechanism for said control surface including a split lever separated by folding action of said portion while still preserving the adjustment of the operating mechanism.

7. In a folding wing airplane having a body and a folding wing, a control surface carried by said folding wing, operating mechanism for said control surface including a split lever for maintaining the adjustment of the operating mechanism in all positions of the wing.

8. The combination with an airplane having a body, a folding wing, and a control surface carried by said wing, of an operating mechanism for said control surface including a lever mounted from said folding wing by a pivot and operatively connected to the control surface, a second lever mounted from the body by a pivot in axial alinement with the first named pivot when the wing is in flying position, a flange extending downwardly from the first mentioned lever and cooperating with a face on said second mentioned lever for causing said levers to operate in unison when the wing is in flying position.

9. In an aircraft having a body and a folding airfoil, balancing means for said aircraft, means carried by said airfoil for operating said balancing means, means carried by said body for actuating said operating means, and a separable connection between the actuating and operating means constructed and arranged to maintain the operating means and the actuating means intact and in adjustment in all positions of the wing.

10. In an aircraft, a body, a wing secured to said body for pivotal movement in respect thereto, balancing means associated with said wing, operating means for said balancing means carried by said wing, actuating means for said operating means carried by said body, a separable connection between said actuating and operating means separated by pivotal movement of said wing.

11. In an airplane, a folding member, a control surface carried by said member, operating mechanism for said control surface including a separable drive automatically separated by the folding action of said folding member.

12. In an airplane, a jointed wing comprising a hinge near one edge thereof, an aileron control comprising control elements on opposite sides of said joint, and means at the joint for transmitting motion in either direction between said control elements, said means comprising two parts which separate as the outer portion of the wing is swung backwards upon said hinge.

13. In an airplane, a jointed wing comprising a hinge near one edge thereof, an aileron control comprising two levers pivoted to the wing one on each side of said joint, corresponding ends of said levers being adapted to be connected with control elements on opposite sides of said joint, and the opposite ends of the levers being adapted to engage each other when the wing is in operative position, whereby the movement of one control element is transmitted through said levers to the other control element.

14. In an airplane, a jointed wing comprising a hinge near one edge thereof, an aileron control comprising a cable divided at the joint of the wing, two levers pivoted to the wing one on each side of said joint, the divided portions of the cable being attached to corresponding ends of said levers, the opposite ends of said levers being adapted to engage each other when the wing is in operative position, whereby the movement of one part of the cable is transmitted to the other part thereof.

In testimony whereof I affix my signature.

FREDERICK ROGERS WEYMOUTH.